(No Model.)

W. R. JOHNSTON.
SPECTACLE FRAME.

No. 357,392.  Patented Feb. 8, 1887.

Witnesses,
Geo. H. Strong
J. H. Nurse

Inventor,
W. R. Johnston
By Dewey & Co.
attys

UNITED STATES PATENT OFFICE.

WILLIAM R. JOHNSTON, OF SAN FRANCISCO, CALIFORNIA.

SPECTACLE-FRAME.

SPECIFICATION forming part of Letters Patent No. 357,392, dated February 8, 1887.

Application filed October 21, 1886. Serial No. 216,891. (No model.)

*To all whom it may concern:*

Be it known that I, WILLIAM R. JOHNSTON, of the city and county of San Francisco, State of California, have invented an Improvement in Spectacles and Eyeglasses; and I hereby declare the following to be a full, clear, and exact description of the same.

My invention relates to the class of spectacles and eyeglasses; and it consists in the novel means, hereinafter described, for adjusting the frames to any size of glasses and securing them.

The object of my invention is to provide a simple, practical, and finished means for adapting the frames to receive different sizes of glasses, which means are of such a character as may be readily operated, as well by those unfamiliar with the manufacture of spectacles and eyeglasses as by those who are so familiar.

Figure 1:
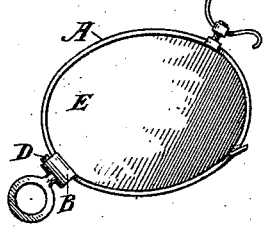
Figure 2:
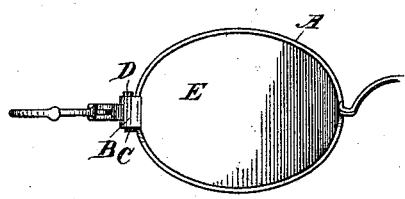
Figure 3:
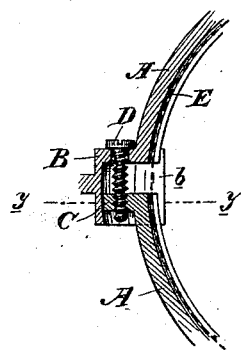
Figure 4:
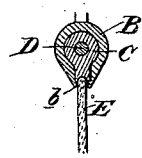

Referring to the accompanying drawings for a more complete explanation of my invention, Figures 1 and 2 are elevations showing the application of my invention to eyeglasses and spectacles. Fig. 3 is an enlarged longitudinal section through socket B. Fig. 4 is a cross-section on line *y y*, Fig. 3.

A is the usual severed frame of a pair of spectacles or eyeglasses. One end of the frame has formed with or attached to it an elongated tubular socket or extension, B, into which a nut, C, secured to or formed with the other end, fits and telescopes. A screw, D, passes into the tubular socket or extension and fitting the nut C, draws it farther into or forces it out of the said socket or extension, thus adjusting the frame. The tubular socket is open or slotted, as shown at *b*, along its inner edge, so as to receive and form a guide for the glass E at that point. The ordinary adjustment of these frames is effected by means of two opposing and similar nuts upon the severed ends of the frame and a short screw passing into said nuts.

It is obvious that the adjustment by these means must be a limited one, because the screw itself is short, and if it is made longer there will be a gap, presenting an unfinished look between the severed ends of the frame. In addition to this, the adjustment, even if the screw is long, will not be true, on account of the straight screw not allowing the severed ends to approach each other upon the proper curve; but with my telescopic adjustment these disadvantages are wholly overcome. There is no gap or space between the meeting ends of the frame, as the space is filled by the tubular socket, which practically forms an extension of one of said ends, and said socket, as I have before stated, forms a guide securing the glass at that point. With my device the limits of adjustment of the frame are considerably extended, and said adjustment is perfectly true. It follows, therefore, that the frame may be made to fit glasses varying considerably in size, and it is therefore particularly advantageous for use in small stores and places in the country, where those who deal in this class of goods have little or no experience in their manufacture.

Having thus described my invention, what I claim as new, and desire to secure by Letters Patent, is—

1. In spectacles or eyeglasses, the frames thereof having their severed ends telescoping, and a means for varying and adjusting the approach and separation of said ends, substantially as herein described.

2. In spectacles or eyeglasses, the frames thereof having their severed ends telescoping, and a screw and nut for varying the approach and separation of said ends, substantially as herein described.

3. In spectacles or eyeglasses, the means for adjusting the frames thereof to suit different sizes of glasses, consisting of the tubular socket or extension B on one of the severed ends of said frames, the nut C upon the other of said ends and fitting and guided in the tubular extension or socket, and the screw D passing into said socket and fitting the nut, substantially as herein described.

4. In spectacles or eyeglasses, the frame A, having the tubular socket or extension B on one of its severed ends, said extension having an open or slotted inner side for the reception and guidance of the glass, and the nut C on the other of said severed ends fitting and adapted to slide within the tubular socket or extension, in combination with the screw D, by which the severed ends are varied and adjusted in their approach and separation, substantially as herein described.

In witness whereof I have hereunto set my hand.

WILLIAM R. JOHNSTON.

Witnesses:
S. H. NOURSE,
C. D. COLE.